2 Sheets—Sheet 2.
C. S. FOWLER.
CRACKER-MACHINE.
No. 170,250. Patented Nov. 23, 1875.
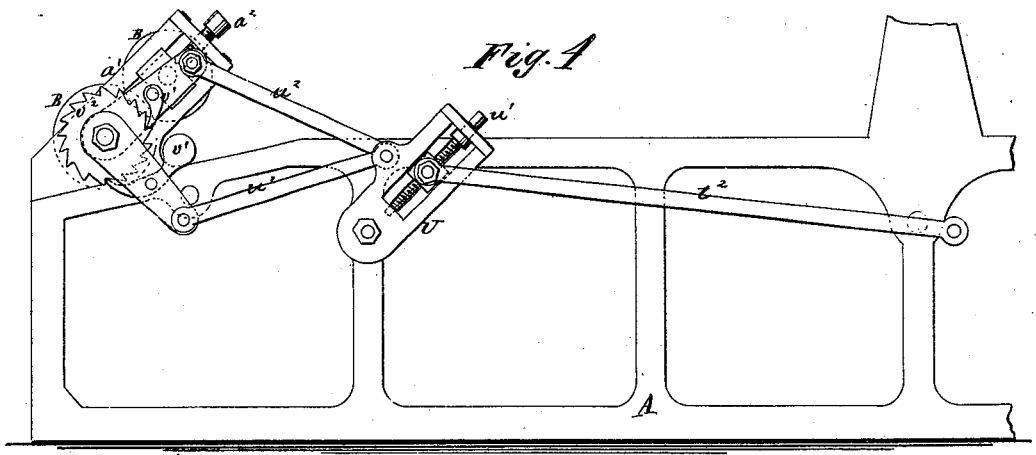
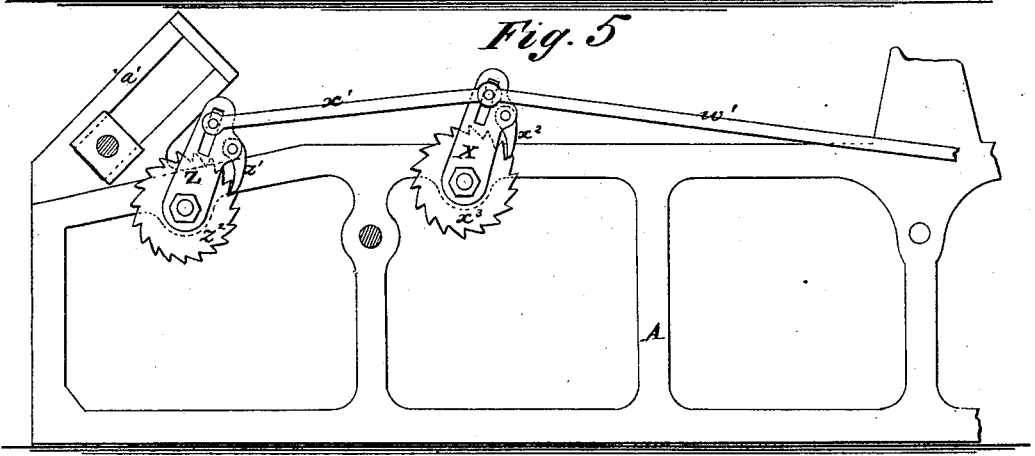
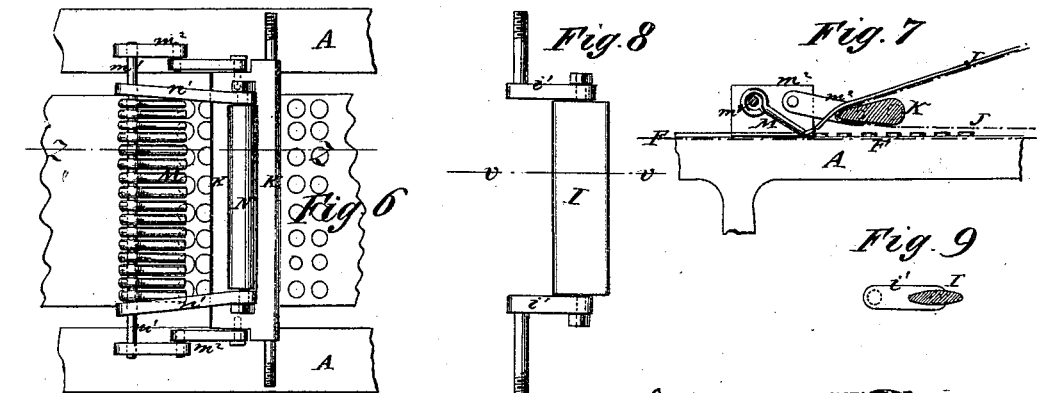
WITNESSES:
A. W. Almquist
A. J. Terry
INVENTOR
Chas S. Fowler
BY
ATTORNEYS.

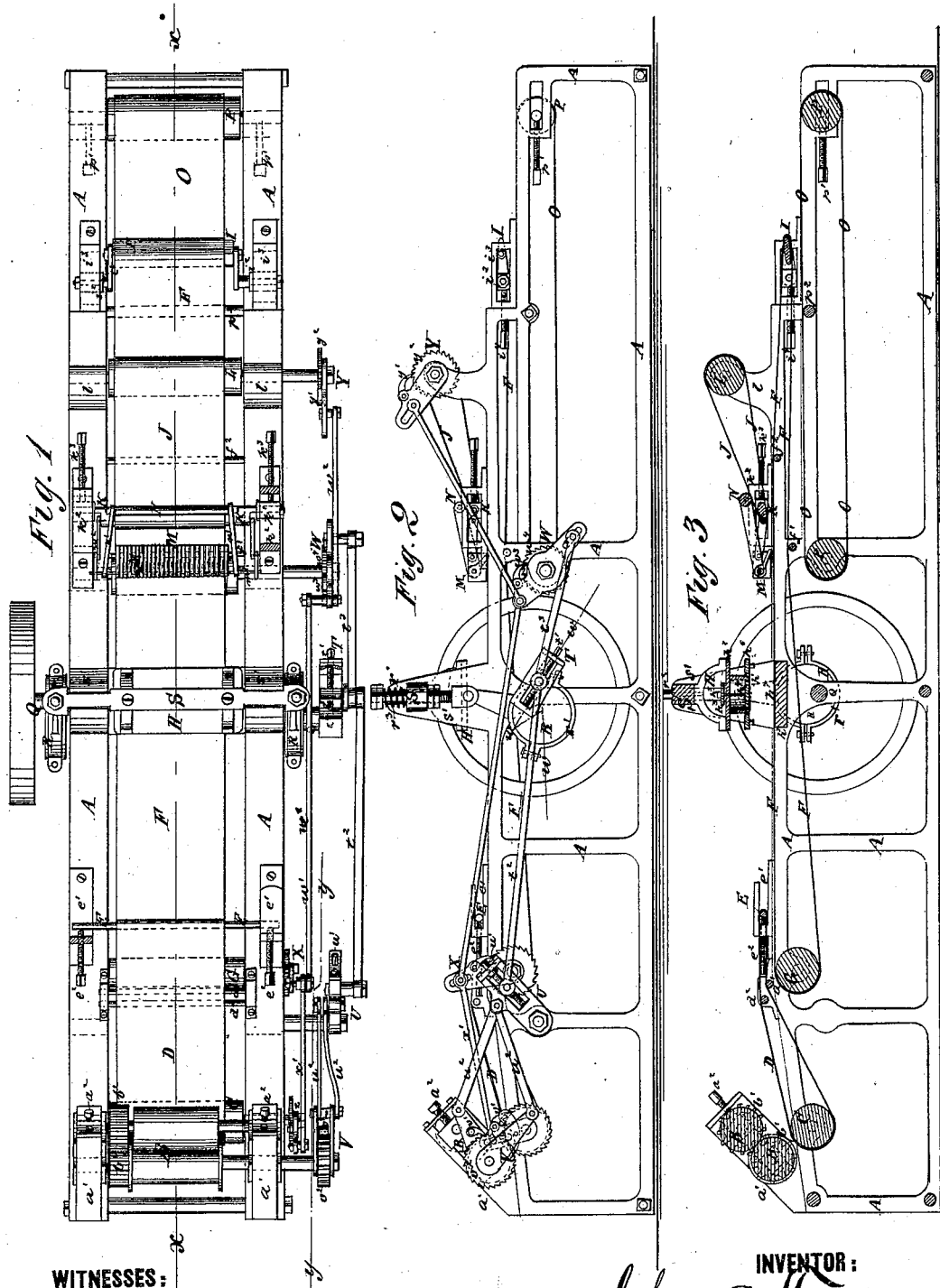

UNITED STATES PATENT OFFICE.

CHARLES S. FOWLER, OF BROOKLYN, NEW YORK.

IMPROVEMENT IN CRACKER-MACHINES.

Specification forming part of Letters Patent No. 170,250, dated November 23, 1875; application filed December 28, 1874.

*To all whom it may concern:*

Be it known that I, CHARLES S. FOWLER, of Brooklyn, in the county of Kings and State of New York, have invented a new and useful Improvement in Dough-Cutting Machines, of which the following is a specification:

Figure 1, Sheet 1, is a top view of my improved machine. Fig. 2, Sheet 1, is a side view of the same. Fig. 3, Sheet 1, is a vertical longitudinal section of the same, taken through the line $x\, x$, Fig. 1. Fig. 4, Sheet 2, is an enlarged detail side view of the device for operating the dough-rollers. Fig. 5, Sheet 2, is an enlarged detail side view of the device for operating the dough-receiving and the dough-carrying aprons, partly in section, through the line $y\, y$, Fig. 1. Fig. 6, Sheet 2, is an enlarged detail top view of the device for removing the scrap. Fig. 7, Sheet 2, is a detail cross-section of the same, taken through the line $z\, z$, Fig. 6. Fig. 8, Sheet 2, is a detail top view of the knife for holding and tightening the carrier-belt. Fig. 9, Sheet 2, is a detail cross-section of the same, taken through the line $v\, v$, Fig. 8. Fig. 10, Sheet, 2 is a detail sectional view of the adjustable crank and the eccentric, taken through the line $w\, w\, w$, Fig. 2.

Similar letters of reference indicate corresponding parts.

My invention has for its object to improve the construction of the class of machines that are used for cutting dough for crackers, cakes, &c., so as to enable them to be more readily adjusted and more thoroughly controlled than when made in the ordinary way, and which will allow the dough to shrink before reaching the cutters, so that the crackers or cakes will not be drawn out of shape by said shrinkage.

The construction and arrangement of parts in which my invention is embodied are as hereinafter described and claimed.

A is the frame of the machine, the rear parts of the top side bars of which are slightly inclined to the rearward, as shown in Figs. 2, 3, 4, and 5. To the rear ends of the top side bars of the frame A are attached the lower ends of two short posts, $a^1$, which project upward and forward, and which are slotted longitudinally to receive the bearings for the dough-rollers B. The upper roller B is held at the required distance above the lower one by set-screws $a^2$, which pass in through the caps of the posts $a^1$, and rest upon or are swiveled to the bearings of the said upper roller B. To one end of the dough-rollers B are attached gear-wheels $b^1$, the teeth of which mesh into each other, so that the rollers may be revolved toward each other and at the same velocity. C is a roller, placed below the dough-rollers B, and pivoted to the frame A. D is the endless apron that receives the sheet of dough from the rollers B, and transfers it to the carrier-apron. The apron D passes around the roller C and around a small roller, E, the bearings of which are placed in slotted blocks $e^1$, attached to the frame A, where they are held forward to give the proper tension to the endless apron D by set-screws $e^2$, passing in through the rear part of the said blocks $e^1$. The roller E is made small, to bring the delivery end of the endless apron C close to the carrier-apron F, so that the dough may readily pass from the one to the other of said aprons. The proper direction is given to the forward part of the apron D by two guide-rollers, $d^1$ $d^2$, placed the one $d^1$ below the lower part or ply, and the other $d^2$ below the upper part of the said apron D, as shown in Fig. 3.

F is the endless carrier-apron, the rear part of which passes around a roller, G, pivoted to the frame A and placed beneath the forward part of the receiving-apron D, so that the apron F may receive the sheet of dough from the said apron D and carry it forward to be cut by the cutting device H, in which $h^1$ are the cutters, which are attached to a plate, $h^2$, attached at its ends to the yokes $h^3$. Within the cutters $h^1$ are placed small disks $h^4$, which are connected by pins or screws with a bar, $h^5$, placed upon the top of the plate $h^2$, and with which are also connected pins or screws passing down through the plate $h^2$, and having a plate, $h^6$, attached to their lower ends. The plate $h^6$ has holes formed through it for the passage of the cutters $h^1$. The disks $h^4$ and plate $h^6$ are held down by their own weight and the weight of the bar $h^5$ and prevent the cut dough and the scrap from being raised by and with the cutters as they rise. The apron F is supported against the downward pressure of the cutters $h^1$ by the cutting-block $h^7$ placed beneath the upper ply of the said apron F and attached to the frame A. The forward part of the carrier-apron F passes around a knife or thin bar, I, the ends of which are secured to the inner arms of the cranks or angle-bars $i^1$, the outer arms of which pass through sliding blocks $i^2$, placed in slotted blocks $i^3$, attached to the frame A. The sliding blocks $i^2$ are adjusted to regulate the tension of the carrier-apron F by set-screws $i^4$, which pass in through the rear ends of the said slotted blocks $i^3$ and press against or are swiveled to the said sliding blocks $i^2$. This arrangement enables the knife I to be readily adjusted to present its edge to the friction of the belt, however it may be adjusted to bring the forward part of the belt F into proper position to deliver the cut dough into the baking-pans. J is the scrap-apron, which is placed in an inclined position above the carrier-apron F between the forward or delivery end of said apron F and the cutting device H. The rear and lower part of the endless apron J passes around a knife or edged bar, K, the ends of which are attached to blocks $k^1$, which slide in slotted blocks $k^2$, attached to the frame A, and are held forward to give the proper tension to the apron J by set-screws $k^3$, which pass in through the forward ends of the slotted blocks $k^2$ and rest against or are swiveled to the said sliding blocks $k^1$. The rear end of the apron J is placed at such a distance above the carrier-apron F that the cut dough—i. e., the biscuits—may readily pass beneath it, as shown in Figs. 6 and 7. The forward part of the apron J passes around a roller, L, pivoted to standards or brackets $l'$ formed upon or attached to the frame A, and which are of such a height that the scraps may be delivered from the forward part of the apron J into a box or pan placed upon the frame A beneath the said forward part of the said apron J. As the dough passes from the cutter H it is first carried beneath the fingers M, which are pivoted on the rod $m^1$, and whose free ends, in passing over the cut portions of the dough, hold them down and thus separate them from the scrap as it is being drawn upon the apron J. From this it will be understood the weight of said cut portions is not of itself sufficient to overcome the adhesion between them and the cut edges of the scrap with which they remain in contact, and the office of the fingers M is, therefore, to overcome such adhesion, and, by holding down the cut dough while the scrap is raised on the apron J, effect their separation in a neat and effective manner. The rod $m^1$ is supported in bars $m^2$, which are jointed to the edged bar K. The roller N, which rests upon the apron J, is used to increase the friction between the scrap and apron, and thus prevent the scrap slipping or falling back. The ends of the roller N are pivoted to the forward ends of the short bars $n^1$, the rear ends of which are pivoted to the rod $m^1$. By this construction the whole device M N is self-adjusting to the thickness of the dough, and the roller N, or the whole device M N, can be raised when desired. Thus the fingers $m$ press the biscuit, or cut portions of the dough, out of the scrap as it passes under them and is drawn up on the apron J. The biscuits remain on the apron F, (see Figs. 6 and 7,) and are carried forward and dropped into pans placed upon the endless apron O, the forward part of which projects in front of the apron F sufficiently to allow the full pans to be readily removed, and its rear part projects beneath the forward part of the said carrier-apron F so far that empty pans can be readily placed upon it in the rear of the pan being filled. The endless apron O passes around two rollers, P, the journals of one of which revolve in stationary bearings attached to the frame A. The journals of the other roller P revolve in slots in the frame A, and are held forward to give the required tension to the apron O by set-screws $p^1$, as shown in Figs. 1, 2, and 3. The upper ply of the apron O is held up in proper position beneath the forward part of the apron F by a guide-roller or rod, $p^2$, attached to the frame A. The lower ply of the forward part of the apron F is held up in proper position above the rear part of the pan-apron O by a rod or roller, $f^1$, attached to the frame A. The upper ply of the carrier-apron F is held up in proper position beneath the scrap-apron J by a roller or rod, $f^2$, attached to the frame A.

Q is the driving-shaft, which revolves in bearings in the frame A, beneath the cutting-block $h^7$, the apron F, and the cutting device H. To one end of the shaft Q is attached a pulley to receive the belt for driving the operating parts of the machine. To the shafts Q, at the sides of the frame A, are attached eccentrics R, around which pass the eccentric straps $r^1$, which are rigidly connected with the jointed arms $r^2$. The upper parts of the jointed arms $r^2$ pass up through holes in the projecting ends of the cross-bar S, which moves up and down in slotted standards $s^1$, formed upon or attached to the frame A. To the middle part of the cross-bar S are attached the yokes $h^3$ of the cutting device H, so that the said cutting device may be raised by and with the cross-bar S. The ends of the cross-bar S rest upon nuts screwed upon the upper parts of the jointed arms $r^2$, so that the said bar S may be raised by and with the arms $r^2$. The cross-bar S is held down upon the nuts of the jointed arms $r^2$ by coiled springs $r^3$, the lower ends of which rest upon the upper sides of the ends of the cross-bar S, and their upper ends rest against nuts screwed upon the upper ends of the said arms $r^2$. The springs $r^3$ hold the cross-bar S down upon the nuts of the arms $r^2$, and at the same time allow the cutters to yield, should they strike an obstruction, and to accomodate themselves to any variation in the thickness of the carrier-apron F. To the end of the driving-shaft Q is attached a crank-arm, T, which is slotted longitudinally to receive the crank-pin, which crank-pin is secured in place adjustably by a swiveled-screw, $t^1$, that passes through the said crank-pin. To the adjustable crank-pin of the crank T is pivoted the end of a connecting-rod, $t^2$, the other end of which is pivoted to the crank-pin of the crank U, which crank-pin is placed in a slot in the said crank U, and is secured in place adjustably by a swiveled screw, $u^1$. The crank U works upon a gudgeon attached to the frame A, and by its adjustability enables the delivery of the dough by the rollers B to be regulated as may be required, even when the machine is in operation. To the crank U is also attached a stationary crank-pin, to which are pivoted the ends of two connecting-rods, $u^2$. The connecting-rods $u^2$ incline from each other, and their outer ends are pivoted to the outer ends of two arms, V, the inner ends of which ride upon and are pivoted to the journal of the lower dough-roller B. To the inner sides of the arms V are pivoted two pawls, $v^1$, which take hold of the teeth of the ratchet-wheel $v^2$ attached to the journal of the dough-roller B, between the said arms V. The upper pawl $v^1$ is held down upon the teeth of the ratchet-wheel $v^2$ by its own weight. The engaging end of the lower pawl $v^1$ is held against the teeth of the ratchet-wheel $v^2$ by making its outer end heavy. To the adjustable crank-pin of the crank T is also pivoted the end of a connecting-rod, $t^3$, the other or forward end of which is pivoted to the crank-pin secured adjustably in a slot in the lower arm of the double crank W. To the upper arm of the double crank W are pivoted the ends of the two connecting-rods $w^1$ $w^2$. The rear end of the connecting-rod $w^1$ is pivoted to a crank-pin secured in a slot in the crank-arm X, and the forward end of the other connecting-rod $w^2$ is pivoted to the crank-pin secured in a slot in the crank-arm Y. To the adjustable crank-pin of the crank-arm X is also pivoted the forward end of the connecting-rod $x^1$, the rear end of which is pivoted to a crank-pin secured in a slot in the crank-arm Z. The crank-arm Z is pivoted to the journal of the roller C, and to its side is pivoted a pawl, $z^1$, that takes hold of a ratchet-wheel, $z^2$, rigidly attached to the journal of the said roller C, and gives an intermittent motion to the receiving-apron D. The crank-arm X is pivoted to the journal of the roller G, and to its side is pivoted a pawl, $x^2$, that takes hold of the ratchet-wheels $x^3$, rigidly attached to the journal of the said roller G, and gives an intermittent motion to the carrier-apron F. The crank-arm W is pivoted to the journal of the rear roller P, and to its side is pivoted a pawl, $w^3$, that takes hold of the ratchet-wheel $w^4$, rigidly attached to the journal of the said roller P, to give an intermittent motion to the pan-apron O. The crank-arm Y is pivoted to the journal of the roller L, and to its side is pivoted a pawl, $y^1$, which takes hold of the ratchet-wheel $y^2$, rigidly attached to the journal of the said roller L, and gives an intermittent motion to the scrap-apron J.

It will be observed that all the endless aprons have an intermittent motion, and that the dough-rollers have an intermittent motion at the same time as the aprons, and a second smaller motion while the said aprons are at rest. This last motion is designed to feed to the apron D dough enough to compensate for the shrinkage of the sheet of dough while upon the said apron D. The motion of the apron D is faster than the motion of the apron F, and delivers the sheet of dough to said apron F in folds, which folds are taken out by the shrinkage by the time the dough reaches the cutting device H. By this means all the shrinkage of the dough takes place before it reaches the cutting device H, so that the cut dough will always retain the form of the cutters. The motion of the three aprons F O J is equal—that is to say, they move at the same time and through equal spaces.

Having thus described my invention, I claim as new and desire to secure by Letters Patent—

1. In a dough-cutting machine, the combination of the apron D and apron F, the former traveling faster than the latter, as described, for the purpose specified.

2. The combination of the pivoted fingers M, the rod $m^1$, and the jointed bars $m^2$, pivoted to the ends of the edge bar, over which the scrap-apron is carried, substantially as shown and described.

3. The combination of the adjustable crank-arm U, and its three connecting rods $t^2$ $u^2$ $w^2$, the two arms V, the two pawls $v^1$, and the ratchet-wheels $v^2$, with the adjustable crank T attached to the driving-shaft Q, and with the journal of one of the dough-rollers B, to give a double intermittent motion to the said dough-roller, substantially as herein shown and described.

CHAS. S. FOWLER.

Witnesses:
JAMES T. GRAHAM,
ALEX. F. ROBERTS.